US012626437B1

(12) United States Patent
Dickenson et al.

(10) Patent No.: US 12,626,437 B1
(45) Date of Patent: May 12, 2026

(54) METHOD AND SYSTEM FOR GENERATING A DIGITAL EXPERIENCE

(71) Applicant: OÜ BeyondOS, Tallinn (EE)

(72) Inventors: Benjamin Dickenson, Evandale SA (AU); Anton Gauffin, Espoo (FI)

(73) Assignee: OÜ Beyond OS, Tallinn (EE)

( * ) Notice: Subject to any disclaimer, the term of this patent is extended or adjusted under 35 U.S.C. 154(b) by 0 days.

(21) Appl. No.: 19/357,145

(22) Filed: Oct. 14, 2025

(51) Int. Cl.
| | |
|---|---|
| *G06T 11/60* | (2006.01) |
| *G06F 40/253* | (2020.01) |
| *G06F 40/35* | (2020.01) |
| *G06F 40/40* | (2020.01) |
| *G06F 40/166* | (2020.01) |

(52) U.S. Cl.
CPC ............ *G06T 11/60* (2013.01); *G06F 40/253* (2020.01); *G06F 40/35* (2020.01); *G06F 40/40* (2020.01); *G06F 40/166* (2020.01); *G06T 2200/24* (2013.01)

(58) Field of Classification Search
CPC .... G06F 3/0484; G06F 3/0486; G06F 3/0481; G06F 3/0482; G06F 3/16; G06F 40/40; G06F 16/955; G06F 3/00; G06F 3/048; G06F 3/0488; G06F 9/445; G06F 9/455; G06F 16/23; G06F 16/903; G06F 16/9035; G06F 16/9535; G06F 16/9538; G06F 16/957; G06F 17/00; G06F 21/60; G06F 3/0483; G06F 3/04842; G06F 3/04847; G06F 3/0485; G06F 9/451; G06F 40/279

See application file for complete search history.

(56) References Cited

U.S. PATENT DOCUMENTS

| | | | | |
|---|---|---|---|---|
| 11,615,238 B2* | 3/2023 | Kayastha | ............ | G06F 3/04817 |
| | | | | 715/202 |
| 2009/0282329 A1* | 11/2009 | Alexander | ............ | G06F 40/166 |
| | | | | 715/243 |
| 2015/0178391 A1* | 6/2015 | Villaron | .............. | G06F 3/04842 |
| | | | | 707/722 |

OTHER PUBLICATIONS

Tseng-Yi Chen, An Enhanced User Interface Design with Auto-Adjusting Icon Placement on Foldable Devices, Oct. 2014.*

* cited by examiner

*Primary Examiner* — Rayeez R Chowdhury

(74) *Attorney, Agent, or Firm* — Ziegler IP Law Group, LLC.

(57) ABSTRACT

Disclosed is method for generating digital experience (DE) using system. The method includes receiving, in dialogue field (DF) of user interface (UI) rendered on first user device, first input signal (IS), for generating first structured output (FSO); rendering first canvas element (FCE) including information related to FSO at first location in canvas workspace (CW) of UI; receiving second IS in DF, for generating second SO (SSO); rendering second CE (SCE) including information related to SSO at second location in CW; analyzing, by spatial grammar interpreter of server system (SS), information in FCE and SCE with relative spatial arrangement, for generating semantic representation (SR) of user intent; constructing, by intent analysis pipeline of SS, intent graph (IG) based on SR; generating, by code generation service of SS, DE based on IG, rendering preview of DE on UI.

15 Claims, 4 Drawing Sheets

METHOD AND SYSTEM FOR GENERATING A DIGITAL EXPERIENCE

TECHNICAL FIELD

The present disclosure relates to a method for generating a digital experience using a system. The present disclosure further relates to a system for generating a digital experience based on user input. The present disclosure also relates to a computer program product for generating a digital experience based on user input.

BACKGROUND

The field of digital experience generation has evolved toward increasingly automated and intelligent systems that enable users to design, prototype, and deploy software applications with minimal technical intervention. Conventional user interface builders and design tools often rely on manual drag-and-drop workflows that require precise positioning and predefined templates. However, such approaches are time-consuming, error-prone, and poorly suited for adaptive or large-scale generation of user interface. Existing conversational assistants have introduced natural language interactions for application design, yet these conversational assistants typically lack spatial awareness and cannot interpret a layout or relationships among visual elements presented on a design canvas. As a result, semantic inconsistencies frequently arise between a user's verbal descriptions and the spatial representations used in the user interface.

In modern Artificial Intelligence (AI)-assisted design environments, attempts have been made to couple large language models with visual prototyping tools. Typically, these implementations interpret text commands to generate interface components but fail to integrate the spatial representations or maintain a persistent semantic model of the design context. Other conventional systems focus on generating code directly from textual input without providing an interactive visual medium that allows users to refine or visualize the evolving digital experience. This creates a disconnect between human conceptualization and machine interpretation, leading to inefficient iteration cycles and ambiguous outcomes. Furthermore, many current solutions depend heavily on predefined component libraries and rule-based logic that limit their adaptability to novel design intents. Current tools seldom maintain a consistent representation of user intent across multiple modalities verbal, textual, and spatial. Consequently, users must repeatedly clarify their goals through trial-and-error interactions, resulting in fragmented workflows and limited creativity.

Therefore, in light of the foregoing discussion, there exists a need to overcome the aforementioned drawbacks.

SUMMARY

The aim of the present disclosure is to provide a method, a system and a computer program product to enable the generation of a digital experience through intelligent interpretation of user input and spatial context, thereby addressing the limitations of existing systems that lack semantic integration between user intent and executable application design. The aim of the disclosure is achieved by the method, the system and a computer program product as defined in the appended independent claims to which reference is made. Advantageous features are set out in the appended dependent claims.

The embodiments of the present disclosure substantially enable to improve the accuracy, coherence, and responsiveness of digital experience generation by bridging natural language understanding with spatial reasoning. Additional aspects, advantages, features, and objects of the present disclosure would be made apparent from the drawings and the detailed description of the illustrative embodiments constructed in conjunction with the appended claims that follow.

Throughout the description and claims of this specification, the words "comprise" and "contain" and variations of the words, for example "comprising" and "comprises", mean "including but not limited to", and do not exclude other components, integers or steps. Moreover, the singular encompasses the plural unless the context otherwise requires: in particular, where the indefinite article is used, the specification is to be understood as contemplating plurality as well as singularity, unless the context requires otherwise.

BRIEF DESCRIPTION OF THE DRAWINGS

Embodiments of the present disclosure will now be described, by way of example only, with reference to the following diagrams wherein.

DETAILED DESCRIPTION OF EMBODIMENTS

Figure 1:
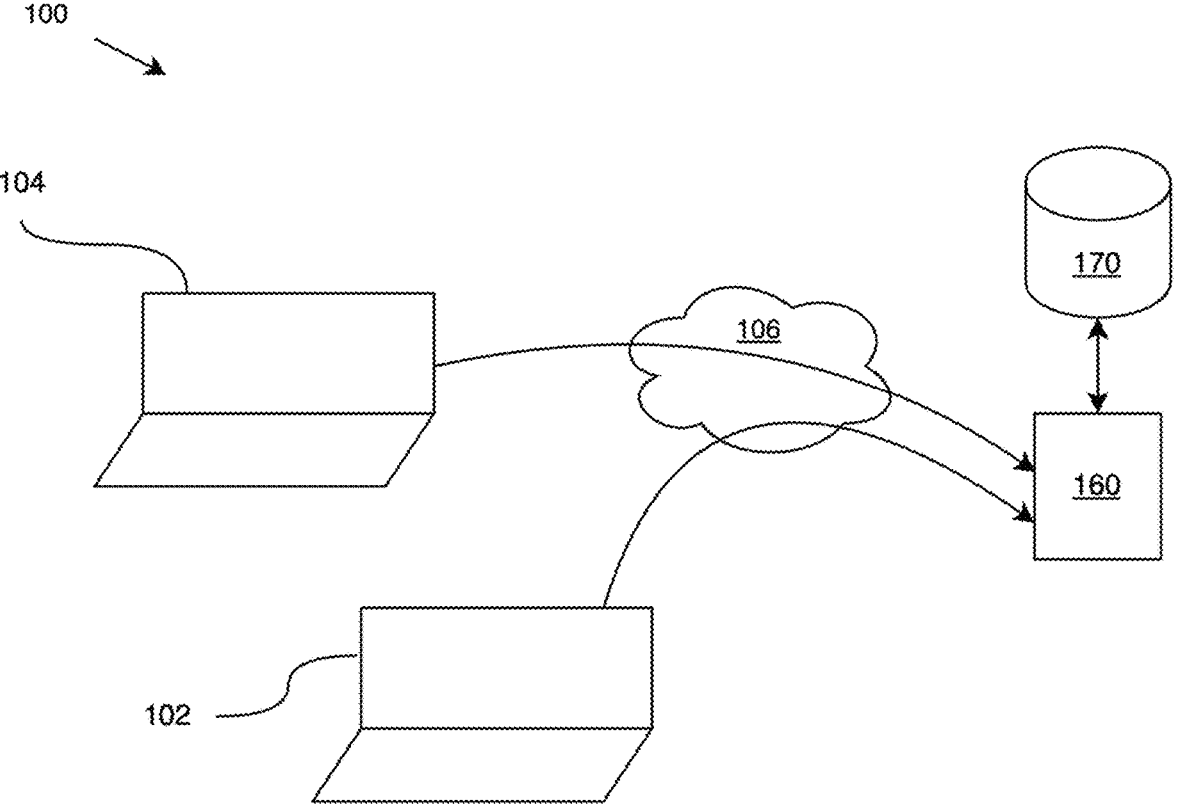
FIG. 1 is a schematic illustration of a system, in accordance with an embodiment of the present disclosure.

The following detailed description illustrates embodiments of the present disclosure and ways in which they can be implemented.

In a first aspect, the present disclosure provides a method for generating a digital experience using a system, the method comprising:

receiving, in a dialogue field of a user interface rendered on a first user device, a first input signal and generating a first structured output based on the first input signal;

rendering, in a canvas workspace of the user interface, a first canvas element including information related to the first structured output at a first location within the canvas workspace;

receiving, in the dialogue field, a second input signal and generating a second structured output based on the second input signal;

rendering, in the canvas workspace, a second canvas element including information related to the second structured output at a second location within the canvas workspace;

analyzing, by a spatial grammar interpreter of a server system, the information contained in the first and second canvas elements together with their relative spatial arrangement, for generating a semantic representation of user intent;

constructing, by an intent analysis pipeline of the server system, an intent graph based on the semantic representation; and generating, by a code generation service of the server system, the digital experience based on the intent graph and rendering a preview of the digital experience on the user interface.

The method for generating a digital experience using a system is directed to enabling the creation of any interactive or non-interactive digital output produced through the cooperation of the user interface and server system. The digital experience may be an executable or a renderable digital output. The digital experience may take the form of a software application, a graphical user interface, an interactive website, a multimedia composition, a data visualization, a video sequence, an audio stream, or any combination of these elements that can be executed, displayed, or interacted with by an end user. The system comprises client-side and server-side components operating in communication with one another. The client-side includes a user interface rendered on a user device, which may be any suitable computing device such as a smartphone, tablet, laptop, or desktop computer. The user device is configured to display the interface, receive input signals from the user, and render previews of the generated digital experience. The server-side includes one or more computing entities configured to interpret user intent, construct semantic representations, and generate executable instructions corresponding to the intended digital experience. This collaboration between the user device and the server system establishes a continuous feedback loop through which the user's inputs are interpreted, visualized, and transformed into a functioning digital experience.

The generating of the digital experience begins by receiving, in the dialogue field of the user interface rendered on the first user device, the first input signal and generating the first structured output based on the first input signal. The first input signal is sent from the user interface to the server system, wherein the server system generates the first structured output based on the first input signal. Notably, at the server system, the first input signal is processed in conjunction with a language model and its associated rules, for generating the first structured output. The dialogue field functions as a multimodal input surface through which the user expresses design intent using natural language or symbolic expressions. When the user provides the first input signal, such as a textual command like, for example, "Create a homepage with a navigation bar and a login form", the system processes this signal using a natural language understanding model to create structured intent data. This structured intent data is organized into a machine-interpretable format—the first structured output—containing key parameters such as component types, content descriptors, and behavioural attributes. The first structured output has a machine readable format (for example, JSON).

Next, the method proceeds to render, in the canvas workspace of the user interface, the first canvas element including information related to the first structured output at the first location within the canvas workspace. The first canvas element is generated by a canvas engine of the server system, is sent from the server system to the first user device, where the canvas workspace of the user interface renders the first canvas element. The canvas workspace serves as a two-dimensional design surface where each structured output is visually represented as a canvas element. The canvas workspace therefore serves both as a visual feedback environment for the user and as a data structure containing spatial information that is processed by the server system. The first canvas element encapsulates metadata that directly corresponds to the first structured output, including identifiers for its function, relationships, and state. The first location is determined either by the user's explicit placement or by the system's intelligent layout algorithm that predicts a contextually appropriate region on the workspace.

The process continues by receiving, in the dialogue field, the second input signal and generating the second structured output based on the second input signal. The second input signal is sent from the user interface to the server system, wherein the server system generates the second structured output based on the second input signal. Notably, at the server system, the second input signal is processed in conjunction with a language model and its associated rules, for generating the second structured output. This second input signal represents an incremental design modification or an additional functional specification provided by the user, for example such as "Add a product carousel below the navigation bar.". The system then interprets this second input signal into the second structured output that maintains coherence with the previously generated data model. The second structured output also has a machine-readable format.

Subsequently, the method renders, in the canvas workspace, the second canvas element including information related to the second structured output at a second location within the canvas workspace. The first canvas element is generated by a canvas engine of the server system, is sent from the server system to the first user device, where the canvas workspace of the user interface renders the first canvas element. The rendering process creates a visual representation of the second structured output as another distinct canvas element. The placement of the second canvas element is informed either by the user's direct input (i.e., the second input signal) or by spatial inference algorithms that ensure appropriate relative positioning—for example, positioning "below," "inside," or "next to" the first canvas element depending on semantic cues derived from the user's direct input.

Once both canvas elements are rendered, the method executes analyzing, by a spatial grammar interpreter (as an example as using LLM) of a server system, the information contained in the first and second canvas elements together with their relative spatial arrangement to generate a semantic representation of user intent. The spatial grammar interpreter is a dedicated module or agent that examines the layout, alignment, and positional patterns between two or more canvas elements, and encodes these into a structured semantic model. It identifies whether one element is hierarchically superior, contained, or functionally related to another. These relationships are encoded into the semantic model that abstracts spatial proximity, orientation, and grouping rules into meaningful intent statements. The result is a semantic representation of user intent—a structured data graph expressing how the user's conceptual components relate within the digital experience.

The method then performs constructing, by the intent analysis pipeline of the server system, the intent graph based on the semantic representation. The intent analysis pipeline converts the semantic representation into the intent graph, wherein the intent graph is a data structure that defines logical dependencies between elements, their interactions and dependencies, and operational flow. This intent graph acts as a central, machine-interpretable model of the intended digital experience. For instance, if the user specifies that the login form should trigger authentication and redirect to another page, the intent analysis pipeline captures this dependency as connected nodes within the intent graph.

The intent graph thereby acts as the central blueprint for all subsequent application generation steps.

Finally, the method includes generating, by the code generation service of the server system, the digital experience based on the intent graph and rendering the preview of the digital experience on the user interface. The code generation service interprets the intent graph, maps each node in the intent graph to corresponding implementation modules or components in a codebase or a component library, and synthesizes executable code that embodies the described structure, functionality, and user flow. This generated digital experience is rendered as a live preview on the user interface, allowing users to visually verify and iteratively refine the output by continuing the dialogue and repositioning elements on the canvas workspace. The generated digital experience can be compiled as a downloadable or executable software module as an example.

The described method provides several distinct technical advantages. By combining dialogue-based input and spatial representation, it enables seamless translation of human intent into computational structures without requiring formal programming. The use of structured outputs for each input signal ensures that each component of the digital experience is traceable and modifiable. Rendering these structured outputs as canvas elements within the canvas workspace improves clarity of intent. The canvas workspace provides visual feedback, allowing users to understand the real-time state of the digital experience. This approach reduces ambiguity compared to purely textual prompts. The spatial grammar interpreter introduces a novel technical dimension of intent recognition by analyzing the relative spatial arrangement between canvas elements, thereby enabling generation of a contextually intelligent semantic representation of user intent.

The intent analysis pipeline provides logical coherence across user-defined elements (i.e., canvas elements derived from structured outputs of input signals), reducing design inconsistencies and preventing dependency errors. The code generation service, which operates directly on the intent graph, accelerates the transition from concept to functional prototype by producing executable code without manual translation. By rendering the preview of the digital experience on the user interface, the system allows the user to instantly verify whether the semantic representation of their intent (captured in the intent graph) has been correctly understood and implemented. Without the preview, the user would need to wait for full compilation or deployment of the digital experience, or perform detailed manual checks, which are time consuming and error prone. Overall, this integrated approach enhances efficiency, reduces human error, and promotes an iterative design workflow that bridges natural communication and automated software generation.

Optionally, analyzing by the spatial grammar interpreter comprises:

detecting proximity between the first and second canvas elements;

determining hierarchy based on relative vertical or horizontal positioning of the first and second canvas elements;

determining containment when one of the first or second canvas elements is spatially enclosed within a boundary of another;

generating multi-dimensional intent vectors representing the spatial relationships between the first and second canvas elements; and applying confidence scoring based on spatial coherence, wherein the semantic representation of user intent is generated based on the detected proximity, the hierarchy, the containment, and confidence scoring.

In this embodiment, the spatial grammar interpreter applies a structured sequence of analytical steps to extract semantic meaning from the spatial arrangement of the first and second canvas elements within the canvas workspace. The interpreter operates as part of the intent analysis pipeline of the server system, accessing element coordinates stored in spatial indexes such as R-trees for efficient detection of proximity and containment relationships.

The proximity between the first and second canvas elements is determined through geometric comparison of their bounding regions. When two elements are positioned close to one another, the interpreter infers a functional or contextual relationship, such as association between a label and a field, or a control and its corresponding data source. Proximity as such can be a number value as number of pixels separating two canvas elements or other arbitrary number value such as a number between 0 to 1 or a unit of length. As an example proximity can refer to relative proximity of two elements in comparison to a third element.

The hierarchy determination provides semantic cues about a structural importance of each element within the digital experience. For instance, a canvas element displayed above another canvas element may represent a container, header, or parent control that governs subordinate canvas elements below it. Hierarchical inference helps the language model of the system understand organizational structures in layouts without explicit metadata.

The containment defines inclusion and ownership between visual components (i.e., the canvas elements)—for example, identifying that a button resides inside a form, or that a text field belongs within a specific panel. By recognizing containment, the interpreter ensures that the semantic representation respects nested relationships inherent in canvas elements.

To unify these spatial relationships (proximity, hierarchy, and containment), the interpreter generates multi-dimensional intent vectors that encode spatial properties such as position, scale, alignment, containment, and relative distance. Each vector represents a measurable relationship between canvas elements in multi-dimensional space. These vectors serve as low-dimensional numerical embeddings enabling rapid comparison, pattern matching, and confidence estimation. These vectors are later processed by the intent analysis pipeline to synthesize a coherent semantic representation of the user's intent.

Confidence scoring based on spatial coherence weights each inferred relationship by evaluating how consistent the detected relationships are with expected design patterns or statistically derived models of spatial grammar. The interpreter assigns a confidence value to each inferred relationship, weighting the influence of proximity, hierarchy, and containment according to how well they conform to expected spatial logic. The final semantic representation of user intent is then generated by aggregating all relationships and their corresponding confidence scores into a unified data structure.

This embodiment strengthens the reliability of spatial interpretation by combining geometric, hierarchical, and probabilistic reasoning. The inclusion of proximity detection enables contextual linkage between visually related elements, while hierarchical analysis introduces structural understanding of layout semantics. Containment recognition ensures that nested and grouped components are correctly interpreted within their functional boundaries. The generation of multi-dimensional intent vectors provides a quantitative model of spatial relationships that can be reused or adapted by the system in subsequent stages of digital experience generation. Confidence scoring adds an additional layer of interpretive accuracy by filtering uncertain or conflicting spatial relationships. This results in a semantic representation that is both robust and adaptable across diverse design configurations. Consequently, the system can infer user intent with higher precision, allowing the generated digital experience to more faithfully reflect the spatial logic envisioned by the user, improving usability and reducing the need for manual layout corrections.

Optionally, the canvas workspace further comprises at least one relational indicator defining a relationship between the first and second canvas elements, and wherein the analyzing by the spatial grammar interpreter further comprises interpreting the relational indicator as indicating whether:

the first canvas element is a master element and the second canvas element is a dependent element;

the second canvas element is a master element and the first canvas element is a dependent element; or the first and second canvas elements have equal weighting in the semantic representation of user intent.

The at least one relational indicator encodes direction and weighting of the relationship between the first canvas element and the second canvas element. The relational indicator may be represented visually, such as by a connecting arrow or line, and logically as a structured object—such as a JSON entry or a set of directional tokens—embedded within the canvas workspace's data model. These tokens identify the master element, the dependent element, and the relative strength or equality of their connection. The at least one relational indicator is created within the canvas interface, by the user, for denoting relational dependency between canvas elements. For example, the user may add a one-way arrow from the first canvas element to the second canvas element, meaning that information of the first canvas element (serving as the master element) has to be taken in consideration when interpreting information of the second canvas element (serving as the dependent element).

When the relational indicator indicates one canvas element as the master element and other canvas element as the dependent element, the system enforces a directional data flow from the master element to the dependent element. The direction tokens or JSON keys representing properties, bindings, or behavioral states of the master element are forwarded to the dependent element during analysis. The dependent element thereby inherits or references contextual parameters—such as layout constraints, data models, or event handlers—defined in the master element's structured output. These directional indicators also guide the construction of the intent graph. The interpreter records directed edges in the intent graph corresponding to master-dependent relationships, while equal-weight relationships are expressed as bidirectional edges with symmetric attributes. When the dependent element is further analyzed using the large language model (LLM) component of the pipeline, the analysis process incorporates both the dependent's intrinsic structured output and the contextual information of the master element. In practice, this means the LLM receives a combined representation containing tokens or JSON descriptors from both the master and the dependent, enabling the model to reason jointly over their combined semantics. The conclusions generated by the LLM therefore reflect not only the dependent element's local meaning but also the inherited behavior, hierarchy, and style from its master element.

In the case of equal weighting between the first and second canvas elements, the interpreter maintains reciprocal references between both elements, synchronizing attributes in the intent graph so that any changes to either element propagate bidirectionally in the intent graph.

This embodiment introduces a data-driven mechanism that combines spatial semantics with explicit directional inheritance, resulting in precise, machine-interpretable intent modeling. The use the at least one rotational indicator allows automated forwarding of properties and behavioral definitions from master to dependent elements, reducing redundancy in the semantic model. The combined analysis of master and dependent components by the LLM ensures that context is preserved and that the dependent's behavior is interpreted within the full scope of its controlling hierarchy. This produces more accurate, less ambiguous, and context-aware semantic representations, improving the consistency of the subsequently generated intent graph and ensuring that downstream code generation reflects hierarchical intent precisely. By embedding relational indicators within the canvas workspace and coupling them with LLM-based reasoning, the system achieves dynamic contextual inheritance across canvas elements, enabling complex, hierarchically structured digital experiences to be generated with minimal manual configuration.

Optionally, a second user device is connected to the server system through the communication network, and wherein the method further comprises:

rendering the user interface including the canvas workspace on the second user device;

receiving, from the second user device, at least one additional input signal and generating a further structured output based on the at least one additional input signal;

rendering, in the canvas workspace, a further canvas element including information related to the further structured output, the further canvas element being positionable relative to the first and second canvas elements; and analyzing, by the spatial grammar interpreter of the server system, the further canvas element together with the first and second canvas elements to update the semantic representation of user intent; and updating, by the code generation service of the server system, the digital experience rendered on the user interface, using the updated semantic representation.

In this embodiment, the system supports collaborative or distributed generation of the digital experience by enabling the second user device to connect to the server system via the communication network. The similar user interface, including the canvas workspace, is rendered on the second user device, thereby allowing multiple participants or devices to view and interact with a shared design environment in real time.

From the second user device, the system receives at least one additional input signal. This at least one additional input is processed, by the server system, into the further structured output, similar in format to the first and second structured outputs. The further canvas element is positionable, wherein its position allows new relationships or design modifications to emerge dynamically within the canvas workspace.

The spatial grammar interpreter analyzes the further canvas element in combination with the previously rendered first and second canvas elements, to update the semantic representation of user intent to include contributions from the second user device. The code generation service accesses the updated semantic representation and updates (i.e., regenerates or adjusts) the digital experience shown on both user interfaces of both the first and second user devices. This ensures that each user device reflects the same state of the digital experience, maintaining a synchronized, collaborative editing session.

This embodiment enables multi-participant and multi-device collaboration within the same digital experience generation session. By rendering the similar interface on multiple user devices and synchronizing through the (shared) semantic representation, the system allows distributed contributors to jointly define, modify, and visualize elements of the digital experience. The update mechanism ensures that all participants (users and/or agents) see a consistent state of the canvas workspace and its generated output. This architecture enhances scalability, supports co-creation, and improves real-time design feedback by seamlessly integrating additional user inputs into the semantic and code generation layers of the server system.

Optionally, either the first user device or the second user device is used to:
    move any of the first, second, or further canvas elements within the canvas workspace to a new spatial location; and/or.
    edit textual information contained in any of the first, second, or further canvas elements,
    for updating the canvas workspace,
    wherein the movement and/or the text editing is communicated to the server system through the communication network, and the spatial grammar interpreter reanalyzes the updated canvas workspace to regenerate or modify the semantic representation of user intent.

In this embodiment, the first user device and the second user device can both directly interact with the canvas workspace for modifying the arrangement or content of the canvas elements. Moving (i.e., repositioning) one or more of the first, second, or further canvas elements to the new spatial location within the canvas workspace can be performed, for example by dragging and dropping the element or by providing a command through the dialogue field. This movement alters the spatial relationships among the elements, such as proximity, hierarchy, or containment, which are interpreted by the spatial grammar interpreter.

Editing the textual information contained within any of the canvas elements, may be performed by modifying component labels, annotations, or descriptive text that carries semantic significance within the digital experience. Such editing adjusts the corresponding structured output linked to that canvas element, refining the meaning associated with the user's intent.

Both movement and text editing actions are communicated to the server system, where they are processed as change events for updating the canvas workspace. The reanalysis of the updated canvas workspace ensures the semantic representation of user intent remains consistent with the latest canvas workspace configuration. The reanalysis may be performed by the language module, and may further cause at least partial regeneration of the digital experience and update of the preview. State synchronization of the updated canvas workspace across multiple user devices may be achieved using conflict-free replicated data types (CRDTs) for automatic convergence of modified canvas element states, together with vector clocks for maintaining causal ordering of the change events.

This embodiment allows flexible, real-time adjustment of both spatial and textual aspects of the digital experience, without interrupting the collaborative workflow. The ability to perform these updates from either (or both) user device(s) provides equal authority to contributors and supports distributed editing. By reusing the same reanalysis mechanism described above, the system preserves semantic coherence, and provides efficiency and consistency in updating the semantic representation. As a result, design iteration becomes fluid, user-driven, and semantically coherent across all devices involved in generating the digital experience.

Optionally, the second user device is operated by an artificial intelligence agent or the artificial intelligence agent is embodied within the canvas workspace as a contributing entity, and wherein the artificial intelligence agent is configured to perform at least one of:
    create one or more additional canvas elements in the canvas workspace;
    move any of the canvas elements or the additional canvas elements to new spatial locations; or
    edit information contained in any of the canvas elements, wherein each contribution made by the artificial intelligence agent is communicated to the server system and incorporated into the analysis by the spatial grammar interpreter for updating the semantic representation of user intent.

In this embodiment, the artificial intelligence agent functions as an autonomous or semi-autonomous participant within the canvas workspace, operating either through the second user device or as a software entity natively embedded in the workspace itself. The agent acts as a contributing entity, capable of interacting with the same interface and design elements as a human user.

The artificial intelligence agent may create additional canvas elements within the workspace, for example by generating components such as forms, interface containers, media objects, or interactive controls based on the evolving semantic representation of user intent. These newly created elements are added as further structured outputs, each having a defined spatial position and content.

The agent may also move existing canvas elements or the additional canvas elements to new spatial locations. Such movement may optimize the layout, improve hierarchy, or correct spatial inconsistencies detected through contextual reasoning. For instance, when a navigation bar overlaps with a content region, the agent may automatically reposition it to restore coherence in the visual hierarchy.

Furthermore, the artificial intelligence agent may edit information contained in any of the canvas elements. This includes modifying text labels, design parameters, or embedded metadata to align the presentation and function of the element with inferred user intent or project context. These edits can be triggered by dialogue exchanges, predefined design rules, or reinforcement learning models integrated into the agent.

Each of the agent's contributions—whether creation, movement, or editing—is communicated to the server system through the communication network, as discussed above. The spatial grammar interpreter then incorporates these contributions into its analysis, updating the semantic representation of user intent. The same inference and regeneration pipeline described previously is applied so that the resulting digital experience reflects both human and artificial contributions in real time.

This embodiment introduces a collaborative design paradigm in which an artificial intelligence agent acts as a co-creator within the digital experience generation process.

The agent enhances efficiency by autonomously generating or adjusting elements that align with detected design intent, thereby reducing manual input requirements. By contributing through the same data channels as human users, the agent seamlessly integrates its modifications into the semantic representation of user intent, ensuring consistency and traceability of all contributions.

Because the spatial grammar interpreter processes the agent's actions in the same analytical framework used for human-driven updates, the system maintains a unified semantic model irrespective of the source of input. This results in a hybrid creation environment where human creativity and artificial reasoning are combined, improving accuracy, design quality, and iterative speed in generating complex digital experiences Optionally, the artificial intelligence agent operates according to a predefined specialization defining a contribution domain within the canvas workspace, the predefined specialization being selected from at least one of:

user interface and user experience design;

data logic and integration;

content generation;

game design or level design;

visual asset creation; and user interaction behavior, wherein the artificial intelligence agent contributes canvas elements, modifications, or annotations corresponding to its predefined specialization, and the contributions are analyzed together with at least the first and second canvas elements, for updating the semantic representation of user intent.

In this embodiment, the predefined specialization determines scope and nature of contributions of the artificial intelligence (AI) agent inside the canvas workspace. Each specialization represents a distinct contribution domain, enabling the AI agent to focus its reasoning and output generation on specific design aspects of the digital experience. The predefined specialization may be defined by an agent-orchestration service. The AI agent may exchange task data with other participants through a collaboration protocol using broadcast and direct-message channels.

When the AI agent is specialized in user interface and user experience design, it contributes canvas elements such as layout structures, interaction flows, or style adjustments that improve usability and aesthetic consistency. In the data logic and integration specialization, the AI agent creates or modifies logical components, connectors, or data pathways that define how the generated digital experience interacts with underlying data models or APIs. For content generation, the AI agent generates textual or multimedia content (such as headings, descriptions, imagery, or audio cues) associated with canvas elements, to enrich the canvas workspace with meaningful context. In game design or level design, the AI agent defines interactive zones, spatial arrangements, or gameplay logic suitable for experiential environments. Under visual asset creation, the AI agent produces or optimizes visual components such as icons, textures, or illustrations that fit stylistic intent of the digital experience. Lastly, when specialized in user interaction behavior, the AI agent contributes scripts, triggers, or state transitions that define how users interact with canvas elements.

The AI agent's presence is visually represented within the canvas workspace via an avatar or focus indicator to signal active contributions. Each agent contribution is assigned a confidence value and status for user verification, ensuring accountability and controllable automation. Analyzing such contributions together with the first and second canvas elements ensures that the spatial grammar interpreter and intent analysis pipeline integrate the AI agent's domain-specific inputs within a same computational framework used to maintain the unified semantic representation of user intent. The updated semantic representation may cause at least partial regeneration or update of the intent graph and the digital experience.

This embodiment introduces a modular framework for domain-specialized artificial intelligence agents operating within the same creative environment. By defining a specific contribution domain, each agent focuses computational resources on a targeted area of expertise, improving the precision and contextual relevance of its output. The system can host multiple AI agents—each responsible for distinct aspects of the digital experience—without conflict, as their contributions are harmonized through the shared semantic representation.

The collaborative analysis of human inputs and specialized AI agent contributions ensures that complex digital experiences can be generated rapidly while preserving consistency across visual, functional, and behavioral layers. This structure promotes scalability, maintainability, and creative diversity within the digital experience generation process.

Optionally, constructing the intent graph based on the semantic representation comprises:

generating, for each canvas element, a plurality of intent nodes representing elements, concepts, patterns, or requirements derived from the semantic representation;

defining, between the plurality of intent nodes, a plurality of intent edges representing explicit, implicit, or derived relationships corresponding to a spatial grammar interpretation;

assigning to each intent node and each intent edge a confidence value and a priority level based on spatial coherence and content relevance; and detecting recurring patterns within the intent graph to refine or expand the semantic representation of user intent.

In this embodiment, the intent analysis pipeline constructs the intent graph from the semantic representation of user intent by decomposing semantic data into a network of intent nodes and intent edges that represent both structural and relational information.

Each intent node encapsulates a distinct conceptual or operational unit related to its corresponding canvas element, said unit being derived from the semantic representation. Examples of such units include, but are not limited to, a functional element, a control element, a layout pattern, content type, a behavioral requirement, an input requirement. For example, a single canvas element representing a user login form may produce multiple intent nodes corresponding to its input fields, validation logic, and event triggers.

Next, the plurality of intent edges reflect logical dependencies (for example, "connect to database"), visual relationships (for example, "contained within header"), or behavioral links (for example, "activates on click") amongst the plurality of intent nodes. One intent edge extends between two intent nodes, and each intent node may be connected to other intent nodes via at least one intent edge. The intent edges form the connective framework that binds intent nodes into a coherent structure, representing both hierarchical and lateral relationships between components of the digital experience.

The confidence value assigned to intent nodes and intent edges quantifies a reliability of each relationship based on spatial coherence, linguistic alignment, consistency with previously observed design patterns, and temporal stability. The priority level defines a temporal order and/or a relative importance by which nodes and edges influence subsequent operations, such as code generation or layout synthesis. High-priority nodes may correspond to essential functional elements and/or earlier temporal precedence, while lower-priority ones may represent optional stylistic features and/or later temporal precedence.

Finally, the detection of recurring patterns within the intent graph is performed by employing pattern detection algorithms. These pattern detection algorithms, such as graph-matching or clustering techniques (including sub-graph mining and embedding-based clustering), identify frequently co-occurring structures—for example, combinations of input fields and validation buttons—and use these recurring structures to generalize or improve the understanding of design intent by refining or expanding the semantic representation. The refined or expanded semantic representation is then stored (for example, in a persistent intent-pattern library and versioned with causal-ordering metadata derived from a synchronization mechanism) and reused across sessions and collaborators, for improving subsequent analysis and generation processes.

This embodiment provides the structural foundation for linking semantic meaning with executable digital structures. By organizing the semantic representation into intent nodes and edges, the system creates a machine-interpretable model that supports reasoning, optimization, and generation tasks. The assignment of confidence values and priority levels introduces measurable parameters that guide deterministic code synthesis while maintaining flexibility for probabilistic reasoning. Detecting recurring patterns enables the system to learn and adapt over time, improving accuracy and efficiency in interpreting similar user intents in future sessions. Overall, this embodiment transforms the semantic representation into a dynamic, self-improving graph model that drives intelligent and scalable digital experience generation.

Optionally, generating the digital experience based on the intent graph comprises:

transforming the intent graph into a structured generation prompt defining functional, visual, and logical requirements;

selecting a generation strategy corresponding to a type of digital experience to be produced;

generating an application structure, component definitions, behavioral logic, and associated data models based on the structured generation prompt;

assembling the generated components into an executable representation of the digital experience; and rendering, in the user interface, the executable representation as the preview of the generated digital experience for user inspection and further modification.

In this embodiment, the code generation service converts the intent graph produced by the intent analysis pipeline into a fully executable digital experience. The structured generation prompt captures all functional, visual, and logical requirements inferred in the intent graph from the semantic representation. This structured generation prompt acts as an intermediate specification layer and may be represented in a machine-readable format such as JSON, XML, or a proprietary schema that preserves intent node attributes, relationships, and priority levels.

Next, the generation strategy for producing the digital experience is selected, based on predefined templates or learned mappings that align the intent graph's structure with the type of the digital experience (for example, web application, mobile interface, immersive environment, or multimedia presentation). The selected strategy determines code synthesis framework, component libraries, and rendering engines to be employed for effectively producing the digital experience. The selected strategy may further include optimization and deployment parameters for target runtime environments.

Then the application structure, the component definitions, the behavioral logic, and the associated data models for the digital experience are generated using the structured generation prompt as a guide. Each intent node contributes one or more executable modules or code segments, and each intent edge defines interaction rules or data bindings between those modules. The resulting code base captures both the visual design and the operational logic of the intended digital experience. This code base may be versioned to maintain traceability.

Next, assembling the generated components into the executable representation of the digital experience involves integrating the components into a cohesive runtime package. The code generation service may also perform optimization routines to ensure efficiency and compatibility across devices.

Finally, the executable representation is rendered as the preview in the user interface (for example, in the canvas workspace). The preview provides a live, interactive visualization of the generated digital experience, enabling users to inspect the layout, functionality, and behavior before deployment. Users may provide additional input or make spatial adjustments, as discussed above, which trigger reanalysis and incremental regeneration of affected components to refine the digital experience further.

This embodiment defines the complete transition from semantic intent to executable digital experience. By using the intent graph as an intermediate abstraction and converting it into a structured generation prompt, the system ensures traceability from user intent to generated output. The modular generation of components and behaviors allows complex applications to be synthesized automatically with high internal coherence. Rendering the preview within the same user interface closes the feedback loop, allowing immediate visual validation and iterative refinement. This accelerates development, reduces design errors, and provides a transparent view of how user intent evolves into functional results. The embodiment thus establishes a self-contained, intelligent digital experience generation process that integrates design understanding, synthesis, and visualization into a unified workflow.

In a second aspect, the present disclosure provides a system for generating a digital experience, the system comprising:

a first user device; and a server system connected to the first user device through a communication network, the server system including a language model and a software development environment, wherein a user interface rendered on the first user device, the user interface comprising a dialogue field configured to receive input signals and to generate structured output based on the input signals, and a canvas workspace configured to render a first canvas element including information related to a first structured output at a first location within the canvas workspace, wherein the first structured output is generated based on a first input signal received in the dialogue field, and to render a second canvas element including information related to a second structured output at a second location within the canvas workspace, wherein the second structured output is generated based on a second input signal received in the dialogue field;

a spatial grammar interpreter of the server system is configured to analyze the information contained in the first and second canvas elements together with their relative spatial arrangement to generate a semantic representation of user intent;

an intent analysis pipeline of the server system is configured to construct an intent graph based on the semantic representation; and a code generation service of the server system is configured to generate the digital experience based on the intent graph and to render a preview of the digital experience on the user interface.

The present disclosure also relates to the system, as described above. Various embodiments and variants disclosed above, with respect to the aforementioned method, apply mutatis mutandis to the system.

The system comprises the first user device and the server system connected through the communication network, forming a distributed architecture for generating and rendering the digital experience. The generated experience is then rendered as the preview in the user interface, enabling real-time inspection and iterative refinement by the user. In addition to the preview, the server system is configured to compile the generated digital experience into a downloadable or deployable object, for example, such as a mobile application, a desktop application, a standalone web package, and similar. This compilation transforms the preview into a fully executable artifact that can be distributed, installed, or executed independently of the design environment.

This embodiment defines a complete interactive architecture that translates the user intent into executable digital experiences. By combining the language model, the spatial grammar interpreter, the intent analysis pipeline, and the code generation service, an intelligent, bidirectional link is provided between human conceptualization and machine synthesis. The ability to compile the rendered digital experience into the downloadable or deployable object extends the usefulness of the system beyond visualization, enabling seamless transition from design to deployment. Moreover, the system has a distributed client-server structure, which ensures efficient performance, while the user interface offers immediate feedback through continuous preview. The system thus delivers a robust framework for generating, refining, and publishing executable digital experiences with minimal manual intervention.

Optionally, in the system, the spatial grammar interpreter is configured to:

detect proximity between the first and second canvas elements;

determine hierarchy based on relative vertical or horizontal positioning;

determine containment when one of the first and second canvas elements is spatially enclosed within a boundary of another;

generate multi-dimensional intent vectors representing spatial relationships between the first and second canvas elements; and apply confidence scoring based on spatial coherence.

In this embodiment, the spatial grammar interpreter of the server system performs a structured, multi-dimensional analysis of the canvas workspace rendered on the first user device. The spatial grammar interpreter continuously monitors the positions and spatial characteristics of the first and second canvas elements as they are created, moved, or modified, as discussed above.

The spatial grammar interpreter is configured to detect proximity between the first and second canvas elements, to allow the spatial grammar interpreter to infer contextual or functional relationships. For instance, that a label belongs to a field, or that two controls are grouped together within a single logical section.

The spatial grammar interpreter then determines hierarchy based on the relative vertical or horizontal (or in general which direction and how far elements are) positioning. The spatial grammar interpreter can infer parent-child or sequential order relationships. For example, an element positioned above another may represent a container or controller that governs subordinate components.

Next, the spatial grammar interpreter determines containment when one of the first and second canvas elements is visually or geometrically enclosed within the boundary of another. This containment analysis identifies nested structures that indicate ownership or compositional grouping within the canvas workspace, for example, a text block within a panel or a button within a form.

From these spatial relationships, the spatial grammar interpreter generates multi-dimensional intent vectors that encode numerical representation of position, orientation, scale, and relational directionality among the first and second canvas elements. These multi-dimensional intent vectors form part of the quantitative data foundation of the semantic representation of the user intent, allowing downstream processes such as the intent analysis pipeline and the code generation service, to reason computationally over spatial logic.

Finally, the spatial grammar interpreter applies confidence scoring based on spatial coherence, wherein the confidence scoring is used to assesses a likelihood that each detected relationship correctly reflects the user's intent, using heuristics or learned models trained on prior design data. The confidence score influences how strongly each spatial relationship contributes to the semantic representation, ensuring that uncertain configurations have proportionally less impact on subsequent analysis.

A technical effect of such analysis of the spatial grammar interpreter is that it provides an analytical foundation for understanding spatial relationships within the system. Additionally, by combining geometric detection, hierarchical inference, and containment analysis, the spatial grammar interpreter transforms purely visual input into structured semantic information. Moreover, the generation of multi-dimensional intent vectors provides a mathematically robust framework for reasoning about layout, while confidence scoring ensures adaptive reliability even in ambiguous design scenarios. Together, these capabilities enable the system to translate user manipulation of visual elements into precise, machine-interpretable meaning, greatly improving the contextual accuracy of generated digital experiences.

Optionally, in the system, the canvas workspace further comprises at least one relational indicator defining a relationship between the first and second canvas elements, and wherein the spatial grammar interpreter is further configured to interpret the relational indicator as indicating whether:

the first canvas element is a master element and the second canvas element is a dependent element;

the second canvas element is a master element and the first canvas element is a dependent element; or the first and second canvas elements have equal weighting in the semantic representation of user intent.

In this embodiment, the canvas workspace within the user interface includes the relational indicator that specifies directional or parity relationship between the first and second canvas elements. The at least one relational indicator can appear as a visible connector, arrow, or linking symbol between the first and second canvas elements, or as a logical object encoded within a data model of the canvas workspace. The at least one relational indicator serves as a declarative feature through which either the user or the system can define how one element influences another within the generated digital experience.

When the at least one relational indicator specifies that the first canvas element is a master element and the second canvas element is a dependent element, the system enforces a one-directional dependency. During analysis, the spatial grammar interpreter and intent analysis pipeline merge contextual data from both the first and second canvas elements so that the dependent element inherits or references the master's behavior, layout logic, or style.

If the at least one relational indicator defines that the second canvas element is the master element and the first canvas element is the dependent element, the same logic is applied in reverse, ensuring consistent directional behavior.

When the at least one relational indicator specifies that the first and second canvas elements have equal weighting, the server system treats them as peers, establishing bidirectional relationships in the semantic representation of the user intent. In this configuration, changes made to either the first canvas element or the second canvas element propagate symmetrically, maintaining layout and behavioural coherence.

Each relational indicator is stored as part of the canvas workspace's internal representation and is analyzed together with spatial relationships already discussed above. The spatial grammar interpreter integrates these relational indicators into its reasoning process, updating the intent graph accordingly to reflect the specified master-dependent or equal-weight configuration.

A technical effect of the canvas workspace further comprising the at least one relational indicator is that it adds an explicit, interpretable mechanism for managing hierarchical and symmetrical relationships between elements in the canvas workspace. Additionally, the inclusion of the at least one relational indicator allows users and automated systems to define control dependencies and equivalences directly, ensuring that behavioral inheritance and mutual constraints are represented consistently in the semantic model. Moreover, by coupling the at least one relational indicator with the spatial grammar analysis, the system achieves greater precision in modelling inter-element relationships, reducing ambiguity and improving the reliability of automated layout and logic generation. This results in a more predictable and semantically coherent generation of the digital experience, especially in complex compositions with multiple interactive components.

Optionally, the system further comprises a second user device connected to the server system through the communication network, wherein the user interface including the canvas workspace is rendered on the second user device, and wherein:

the second user device is configured to provide at least one additional input signal to generate a further structured output;

the canvas workspace is configured to render a further canvas element including information related to the further structured output, the further canvas element being positionable relative to the first and second canvas elements;

the spatial grammar interpreter of the server system is configured to analyze the further canvas element together with the first and second canvas elements to update the semantic representation of user intent; and the code generation service of the server system is configured to update the digital experience rendered on the user interface, using the updated semantic representation.

In this embodiment, the system incorporates the second user device that connects to the server system through the communication network, enabling distributed collaboration. The same user interface and canvas workspace are rendered on the second user device, providing a shared view and synchronized interaction environment. Both the first and second user devices can access and modify the canvas workspace in real time, allowing simultaneous co-creation of the digital experience.

The second user device is configured to transmit at least one additional input signal to the server system. This at least one additional input signal, which could originate from a dialogue command, a gesture, or a manipulation of the canvas workspace, is processed into a further structured output by the same mechanism as described above. The canvas workspace then renders a further canvas element representing this structured output, which can be freely positioned relative to the first and second canvas elements.

The spatial grammar interpreter analyzes the further canvas element together with the existing canvas elements (namely, the first canvas element and the second canvas element) to produce an updated semantic representation of the user intent. The intent analysis pipeline and code generation service operate on this updated representation to regenerate or modify the digital experience, ensuring that all connected devices view the same, synchronized version of the generated experience. The code generation service immediately updates the rendered preview in each user interface, maintaining consistency across all collaborative endpoints.

Beneficially, this embodiment extends the system's capability to support multi-user and multi-device collaboration. By rendering the same canvas workspace on multiple user devices and maintaining synchronization through the server system, contributors can jointly edit and refine the digital experience in real time.

The architecture of the system allows each user device to operate as an equal participant in the design process, with all modifications being integrated and reanalyzed automatically. This distributed configuration promotes creative collaboration, accelerates development cycles, and ensures that the semantic representation of user intent remains unified across all contributors. The system thereby supports scalable, collaborative digital experience generation while preserving consistency, precision, and responsiveness.

Optionally, in the system, the second user device is operated by an artificial intelligence agent or the artificial intelligence agent is embodied within the canvas workspace as a contributing entity, and wherein the artificial intelligence agent is configured to perform at least one of:

create one or more additional canvas elements in the canvas workspace;

move any of the canvas elements or the additional canvas elements to new spatial locations; or edit information contained in any of the canvas elements, wherein each contribution made by the artificial intelligence agent is communicated to the server system and incorporated into the analysis by the spatial grammar interpreter to update the semantic representation of user intent.

In this embodiment, the artificial intelligence agent functions either as the controlling entity of the second user device or as an embedded digital participant within the canvas workspace. The artificial intelligence agent acts as an autonomous contributor capable of performing the same operations as a human collaborator. Moreover, actions and generated outputs of the artificial intelligence agent are interpreted and incorporated into the semantic representation of the user intent in the same analytical pipeline, as discussed above. Moreover, the artificial intelligence agent can create one or more additional canvas elements in the canvas workspace. These one or more additional canvas elements could represent new components, containers, or logical modules within the digital experience, generated based on the artificial intelligence agent's learned model of design patterns or inferred user intent. The artificial intelligence agent may also move any of the existing canvas elements or one or more additional canvas elements to new spatial locations, optimizing layout consistency or correcting spatial relations that deviate from expected design coherence. Furthermore, the artificial intelligence agent can edit information contained in any of the first and second canvas elements, for example such as adjusting textual labels, parameters, or annotations to align the canvas workspace with inferred goals. Each contribution, whether creation, movement, or editing, is communicated to the server system through the communication network and processed in real time or near-real time by the spatial grammar interpreter. The spatial grammar interpreter integrates the artificial intelligence agent's contributions into the semantic representation of the user intent, enabling collaborative interaction between the users and artificial intelligence within the same unified canvas workspace.

A technical effect of the aforementioned feature is that it introduces a hybrid collaborative environment in which the artificial intelligence agent functions as an intelligent co-designer. By participating directly within the canvas workspace, the artificial intelligence agent enhances productivity and consistency by autonomously contributing new elements, refining layout, or optimizing information structures.

The integration of the artificial intelligence agent's contributions into the same analytical framework used for human actions ensures that all updates, regardless of origin, are treated uniformly and coherently within the semantic model. As a result, the generated digital experience benefits from both human creativity and machine-driven optimization. The outcome is an adaptive, intelligent design ecosystem capable of producing sophisticated, semantically consistent digital experiences with reduced manual effort.

In a third aspect, the present disclosure provides a computer program product comprising program code stored on a non-transitory computer-readable medium, the program code being executable by at least one processor of a server system and/or a user device to perform the method according to the first aspect.

The present disclosure also relates to the computer program product, as described above. Various embodiments and variants disclosed above, with respect to the aforementioned method and the aforementioned system, apply mutatis mutandis to the computer program product.

In this embodiment, the computer program product contains program code stored on a non-transitory computer-readable medium, such as solid-state memory, magnetic storage, or optical media. When executed by at least one processor of a server system or user device, the program code performs the method for generating a digital experience as discussed above.

The stored program code includes machine-executable instructions that implement the modules and processes defined in the preceding embodiments. These include code instructions for receiving and processing input signals from the dialogue field, generating structured outputs, and rendering canvas elements in the canvas workspace. Further, the program code enables the operation of the spatial grammar interpreter, which analyzes spatial relationships and constructs the semantic representation of user intent, as well as the intent analysis pipeline, which builds the intent graph.

The program code also implements the code generation service, which generates the digital experience based on the intent graph and renders it as a preview on the user interface. The same codebase generated by the code generation service could include functions for compiling the generated digital experience into a downloadable or deployable object.

When the program code is executed on a distributed processor, communication between components of the system is managed through network protocols ensuring synchronization of data structures, semantic representations, and generated outputs. Herein, when executing the program code on the distributed processor, the program code is executed partially on the first user device, and partially on the server system.

FURTHER CONSIDERATIONS

An integrated framework is provided for generating digital experiences through a combination of human input, spatial reasoning, and artificial intelligence-driven analysis.

Moreover, multiple user devices are optionally supported, wherein the multiple user devices operate simultaneously, allowing distributed or collaborative design sessions where all the users share the same synchronized canvas workspace. The artificial intelligence agent could also participate as an autonomous contributor, creating or modifying the canvas elements according to predefined specializations such as interface design, data logic, or content generation. Through iterative communication between the user devices and the server system, the semantic representation and intent graph evolve dynamically as inputs change.

Once the digital experience is finalized, the code generation service can compile the finalized digital experience into the deployable or downloadable object, thus allowing seamless transition from concept to execution. The result is a unified system that bridges natural language understanding, spatial reasoning, and automated code synthesis to transform the user intent into functional, executable digital experiences.

To ensure secure collaboration, the communication network may comprise an authentication layer configured to authenticate any user device prior to enabling modification of the canvas workspace. Collaborative editing is synchronized by the server system using event-driven change propagation with a defined conflict-resolution policy to maintain a single coherent state of the semantic representation of the user intent across user devices. User corrections made in the dialogue field or by manipulating canvas elements feed back into the spatial grammar interpreter so that confidence scoring and, where applicable, priority assignments in the intent graph are adaptively updated to reflect confirmed intent. The canvas workspace may additionally render visual indicators, such as directional connectors or highlighting, to communicate detected relationships and current confidence levels to the user during generation and preview.

DETAILED DESCRIPTION OF THE DRAWINGS

Referring to FIG. 1, there is a schematic illustration of a system 100, in accordance with an embodiment of the present disclosure. The system 100 comprises a first user device 102. Optionally, the system 100 further comprises a second user device 104. The first user device 102 and, optionally, the second user device 104 are computing devices, capable of executing a software client for collaborative application development. The first user device 102 and, optionally, the second user device 104 are connected through a communication network 106 to a server system 160. The server system 160 is includes a language model 170 and a software development environment that enables communication and interaction between the first user device 102 the language model 170, and, optionally, the second user device 104.

During operation, a user interface rendered on the first user device 102 and, optionally, the second user device 104 transmit input signals to the server system 160 via the communication network 106. The server system 160 processes the received input signals using, optionally, the language model 170 and generates structured outputs, for example, such as text, user interface components, information to render user interface components, information in user canvas elements. The generated structured outputs are transmitted back to the first user device 102 and the second user device 104 for visualization and further interaction.

FIG. 1 thus illustrates a structural and a functional relationship between distributed components of the system 100. The first user device 102 and the second user device 104 form an interface layer, the communication network 106 provides connectivity, and the server system 160 with the language model 170 performs interpretation and code generation functions.

Figure 2:
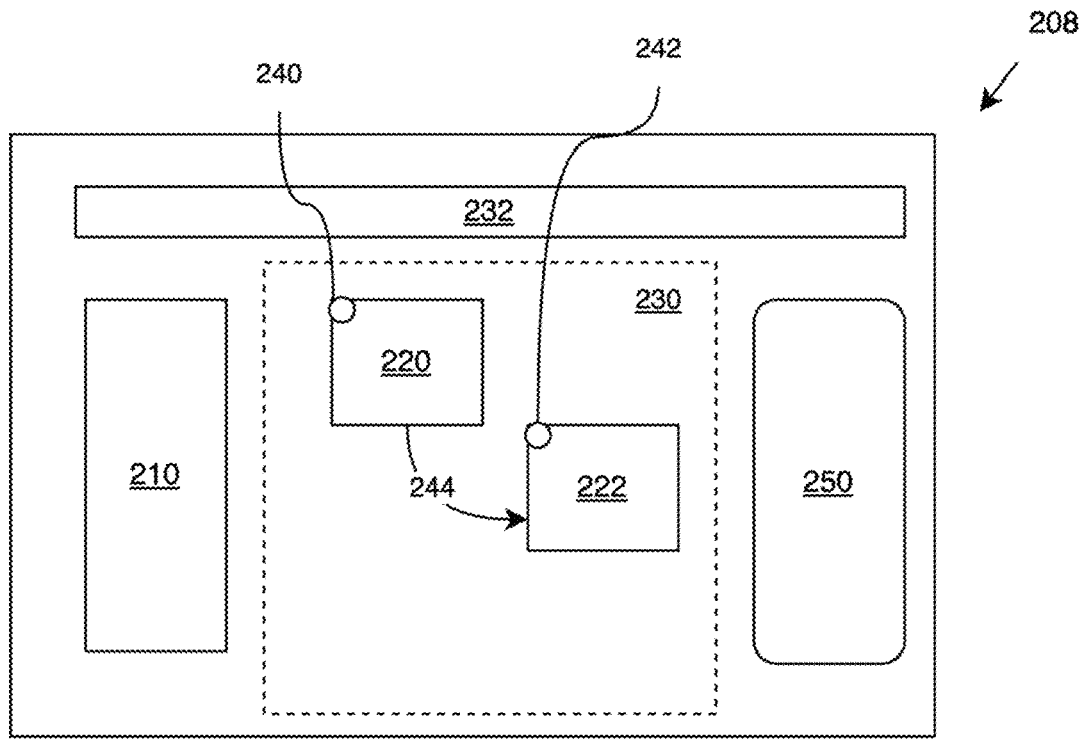
FIG. 2 shows an illustration of an exemplary user interface rendered on a first user device or a second user device of FIG. 1, in accordance with an embodiment of the present disclosure.

Referring to FIG. 2, there is shown an illustration of an exemplary user interface 208 rendered on a first user device 102 or a second user device 104 of FIG. 1, in accordance with an embodiment of the present disclosure. The user interface 208 comprises a dialogue field 210, a canvas workspace 230, and a tool bar 232. The dialogue field 210 enables a user to enter textual or multimodal input and to view outputs generated by a large language model (LLM) of the server system 160 through the communication network 106.

When the user activates an output displayed in the dialogue field 210, the system 100 generates a first canvas element 220 which is presented within the canvas workspace 230. The first canvas element 220 includes structured information, for example, such as a JSON representation, text fragments, and graphical sketches, and similar, representing elements of an application under development. The first canvas element 220 is positioned in a first position 240 relative to the canvas workspace 230.

The user may continue interaction through the dialogue field 210 to generate a second canvas element 222, which is positioned in a second position 242 in the canvas workspace 230. Both the first canvas element 220 and the second canvas elements 222 can be freely moved, resized, and arranged by the user within the canvas workspace 230.

The tool bar 232 provides access to functions such as editing, layout adjustment, collaboration control, and activation of AI-assisted operations. These functions enable the user to manage spatial organization, create relationships, and refine the structure of the canvas workspace 230.

Optionally, the canvas workspace 230 further comprises at least one relational indicator (depicted as a relational indicator 244 as represented by an arrow-headed line) may be created between the first canvas element 220 and the second canvas element 222, to represent a dependency or directional relationship between the first canvas element 220 and the second canvas element 222. For instance, the relational indicator 244 may specify that the information in the first canvas element 220 is to be used as an input for processing the second canvas element 222. The arrow-headed line of the relational indicator 244 indicates directionality of dependency.

The canvas workspace 230 thereby forms a structured and spatially organized representation of a user intent, including the first position 240 of the first canvas element 220, the second position 242 of the second canvas element 222, and relationships between the first canvas element 220 and the second canvas element 222, defined by the relational indicator 244. This information is analyzed by the server system 160 and the language model 170 to derive an intent graph that drives automated code generation. The resulting application is displayed in a user interface element 250 of a target device, allowing the user to preview and refine the generated functionality in real time. In this regard, the target device could be the first user device 102, the second user device 104, or a third user device associated with an end user.

FIG. 2 thus illustrates an operational structure of the user interface 208 and demonstrates how spatial arrangement, relational connections, and tool-based interaction collectively enable visual, collaborative, and semantically interpretable software generation.

Figure 3A:
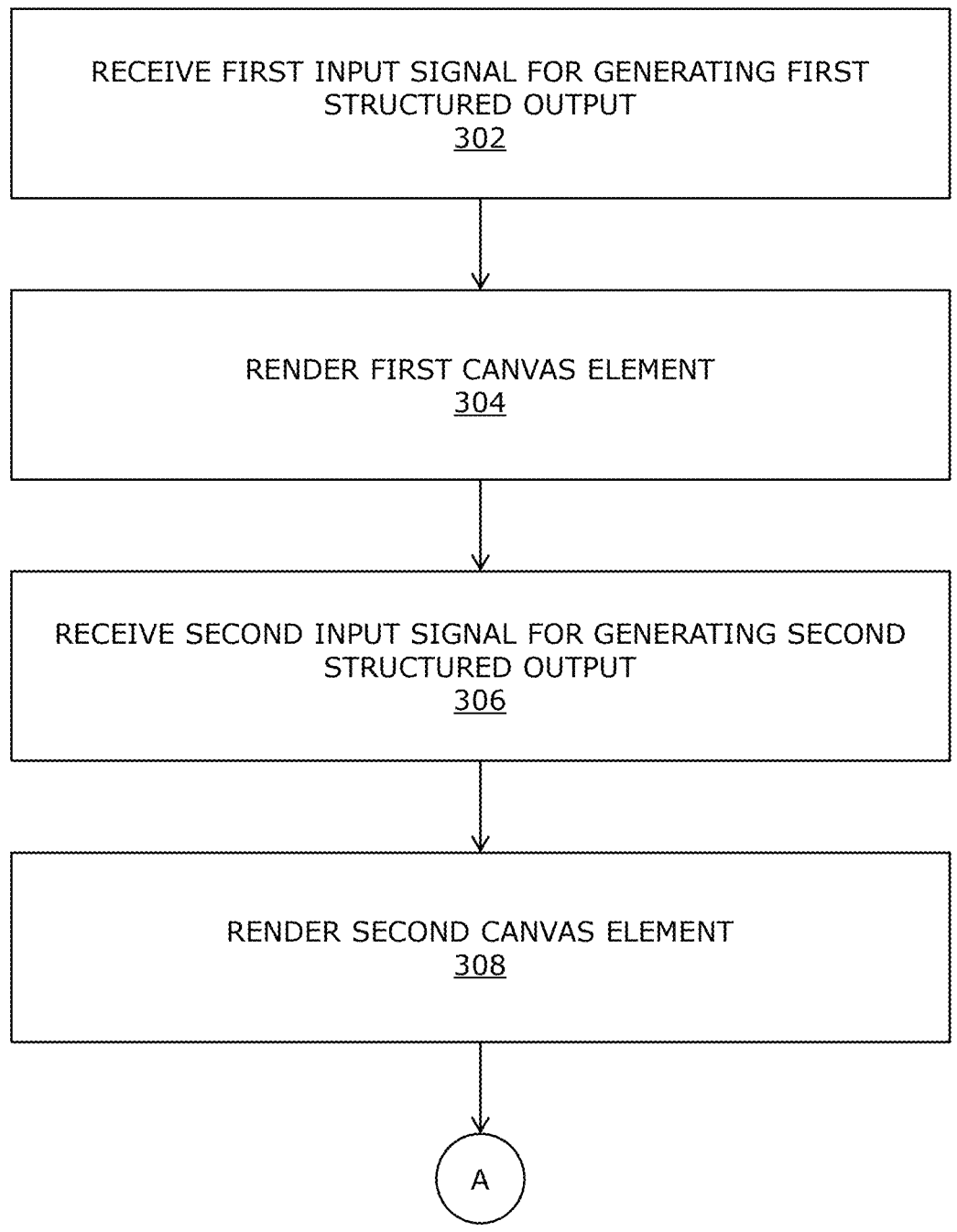
FIGS. 3A and 3B collectively illustrate steps of a method for generating a digital experience using a system, in accordance with an embodiment of the present disclosure.
Figure 3B:
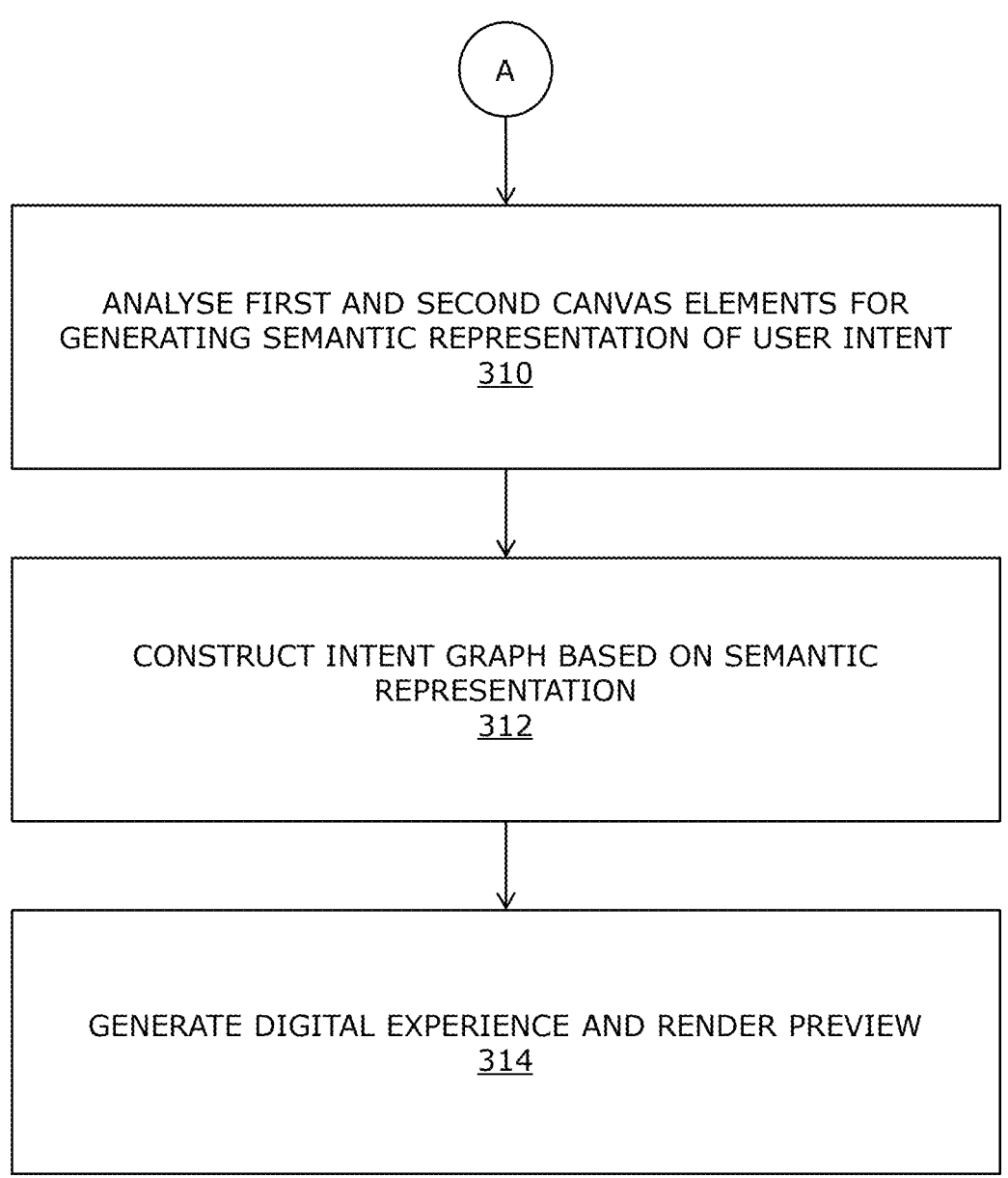

Referring to FIGS. 3A and 3B collectively, illustrated are steps of a method for generating a digital experience using a system, in accordance with an embodiment of the present disclosure. At step 302, a first input signal is received, in a dialogue field of a user interface rendered on a first user device, and a first structured output is generated based on the first input signal. At step 304, a first canvas element is rendered, in a canvas workspace of the user interface, including information related to the first structured output at a first location within the canvas workspace. At step 306, a second input signal is received, in the dialogue field, and a second structured output is generated based on the second input signal. At step 308, a second canvas element is rendered, in the canvas workspace, including information related to the second structured output at a second location within the canvas workspace. At step 310, the information contained in the first and second canvas elements together with their relative spatial arrangement are analyzed, by a spatial grammar interpreter of a server system, for generating a semantic representation of user intent. At step 312, an intent graph is constructed, by an intent analysis pipeline of the server system, based on the semantic representation. At step 314, the digital experience is generated, by a code generation service of the server system, based on the intent graph and rendering a preview of the digital experience on the user interface.

The aforementioned steps are only illustrative and other alternatives can also be provided where one or more steps are added, one or more steps are removed, or one or more steps are provided in a different sequence without departing from the scope of the claims herein.

Provided figures are merely examples, which should not unduly limit the scope of the claims herein. The person skilled in the art will recognize many variations, alternatives, and modifications of embodiments of the present disclosure.

The invention claimed is:

1. A method for generating a digital experience using a system, the method comprising:

receiving, in a dialogue field of a user interface rendered on a first user device, a first input signal and generating a first structured output based on the first input signal;

rendering, in a canvas workspace of the user interface, a first canvas element including information related to the first structured output at a first location within the canvas workspace;

receiving, in the dialogue field, a second input signal and generating a second structured output based on the second input signal;

rendering, in the canvas workspace, a second canvas element including information related to the second structured output at a second location within the canvas workspace;

analyzing, by a spatial grammar interpreter of a server system, the information contained in the first and second canvas elements together with their relative spatial arrangement, for generating a semantic representation of user intent, wherein the analyzing comprises:

detecting proximity between the first and second canvas elements;

determining hierarchy based on relative vertical or horizontal positioning of the first and second canvas elements;

determining containment when one of the first and second canvas elements is spatially enclosed within a boundary of another;

constructing, by an intent analysis pipeline of the server system, an intent graph based on the semantic representation; and generating, by a code generation service of the server system, the digital experience based on the intent graph and rendering a preview of the digital experience on the user interface.

2. The method according to claim 1, wherein analyzing by the spatial grammar interpreter further comprises:

generating multi-dimensional intent vectors representing spatial relationships between the first and second canvas elements; and applying confidence scoring based on spatial coherence, wherein the semantic representation of user intent is generated based on the detected proximity, the hierarchy, the containment, the intent vectors, and the confidence scoring.

3. The method according to claim 1, wherein the canvas workspace further comprises at least one relational indicator defining a relationship between the first and second canvas elements, and wherein the analyzing by the spatial grammar interpreter further comprises interpreting the relational indicator as indicating whether:

the first canvas element is a master element and the second canvas element is a dependent element;

the second canvas element is a master element and the first canvas element is a dependent element; or the first and second canvas elements have equal weighting in the semantic representation of user intent.

4. The method according to claim 1, wherein a second user device is connected to the server system through a communication network, and wherein the method further comprises:

rendering the user interface including the canvas workspace on the second user device;

receiving, from the second user device, at least one additional input signal and generating a further structured output based on the at least one additional input signal;

rendering, in the canvas workspace, a further canvas element including information related to the further structured output, the further canvas element being positionable relative to the first and second canvas elements;

analyzing, by the spatial grammar interpreter of the server system, the further canvas element together with the first and second canvas elements to update the semantic representation of user intent; and updating, by the code generation service of the server system, the digital experience rendered on the user interface, using the updated semantic representation.

5. The method according to claim 4, wherein either the first user device or the second user device is used to:

move any of the first, second, or further canvas elements within the canvas workspace to a new spatial location; and/or edit textual information contained in any of the first, second, or further canvas elements, for updating the canvas workspace, wherein the movement and/or the text editing is communicated to the server system through the communication network, and the spatial grammar interpreter reanalyzes the updated canvas workspace to regenerate or modify the semantic representation of user intent.

6. The method according to claim 5, wherein the second user device is operated by an artificial intelligence agent or the artificial intelligence agent is embodied within the canvas workspace as a contributing entity, and wherein the artificial intelligence agent is configured to perform at least one of:

create one or more additional canvas elements in the canvas workspace;

move any of the canvas elements or the additional canvas elements to new spatial locations; or edit information contained in any of the canvas elements, wherein each contribution made by the artificial intelligence agent is communicated to the server system and incorporated into the analysis by the spatial grammar interpreter for updating the semantic representation of user intent.

7. The method according to claim 6, wherein the artificial intelligence agent operates according to a predefined specialization defining a contribution domain within the canvas workspace, the predefined specialization being selected from at least one of:

user interface and user experience design;

data logic and integration;

content generation;

game design or level design;

visual asset creation; and user interaction behavior, wherein the artificial intelligence agent contributes canvas elements, modifications, or annotations corresponding to its predefined specialization, and the contributions are analyzed together with at least the first and second canvas elements, for updating the semantic representation of user intent.

8. The method according to claim 1, wherein constructing the intent graph based on the semantic representation comprises:

generating, for each canvas element, a plurality of intent nodes representing elements, concepts, patterns, or requirements derived from the semantic representation;

defining, between the plurality of intent nodes, a plurality of intent edges representing explicit, implicit, or derived relationships corresponding to a spatial grammar interpretation;

assigning to each intent node and each intent edge a confidence value and a priority level based on spatial coherence and content relevance; and detecting recurring patterns within the intent graph to refine or expand the semantic representation of user intent.

9. The method according to claim 1, wherein generating the digital experience based on the intent graph comprises:

transforming the intent graph into a structured generation prompt defining functional, visual, and logical requirements;

selecting a generation strategy corresponding to a type of digital experience to be produced;

generating an application structure, component definitions, behavioral logic, and associated data models based on the structured generation prompt;

assembling the generated components into an executable representation of the digital experience; and rendering, in the user interface, the executable representation as the preview of the generated digital experience for user inspection and further modification.

10. A system for generating a digital experience, the system comprising:

a first user device; and a server system connected to the first user device through a communication network, the server system including a language model and a software development environment, wherein a user interface rendered on the first user device, the user interface comprising a dialogue field configured to receive input signals and to generate structured output based on the input signals, and a canvas workspace configured to render a first canvas element including information related to a first structured output at a first location within the canvas workspace, wherein the first structured output is generated based on a first input signal received in the dialogue field, and to render a second canvas element including information related to a second structured output at a second location within the canvas workspace, wherein the second structured output is generated based on a second input signal received in the dialogue field;

a spatial grammar interpreter of the server system configured to analyze the information contained in the first and second canvas elements together with their relative spatial arrangement to generate a semantic representation of user intent by;

detecting proximity between the first and second canvas elements;

determining hierarchy based on relative vertical or horizontal positioning of the first and second canvas elements;

determining containment when one of the first and second canvas elements is spatially enclosed within a boundary of another; an intent analysis pipeline of the server system is configured to construct an intent graph based on the semantic representation; and a code generation service of the server system is configured to generate the digital experience based on the intent graph and to render a preview of the digital experience on the user interface.

11. The system according to claim 10, wherein the spatial grammar interpreter is further configured to:

generate multi-dimensional intent vectors representing spatial relationships between the first and second canvas elements; and apply confidence scoring based on spatial coherence.

12. The system according to claim 10, wherein the canvas workspace further comprises at least one relational indicator defining a relationship between the first and second canvas elements, and wherein the spatial grammar interpreter is further configured to interpret the relational indicator as indicating whether:

the first canvas element is a master element and the second canvas element is a dependent element;

the second canvas element is a master element and the first canvas element is a dependent element; or the first and second canvas elements have equal weighting in the semantic representation of user intent.

13. The system according to claim 10, further comprising a second user device connected to the server system through the communication network, wherein the user interface including the canvas workspace is rendered on the second user device, and wherein:

the second user device is configured to provide at least one additional input signal to generate a further structured output;

the canvas workspace is configured to render a further canvas element including information related to the further structured output, the further canvas element being positionable relative to the first and second canvas elements;

the spatial grammar interpreter of the server system is configured to analyze the further canvas element together with the first and second canvas elements to update the semantic representation of user intent; and the code generation service of the server system is configured to update the digital experience rendered on the user interface, using the updated semantic representation.

14. The system according to claim 13, wherein the second user device is operated by an artificial intelligence agent or the artificial intelligence agent is embodied within the canvas workspace as a contributing entity, and wherein the artificial intelligence agent is configured to perform at least one of:

create one or more additional canvas elements in the canvas workspace;

move any of the canvas elements or the additional canvas elements to new spatial locations; or edit information contained in any of the canvas elements, wherein each contribution made by the artificial intelligence agent is communicated to the server system and incorporated into the analysis by the spatial grammar interpreter to update the semantic representation of user intent.

15. A computer program product comprising program code stored on a non-transitory computer-readable medium, the program code being executable by at least one processor of a server system and/or a user device to generate a digital experience using a system by:

receiving, in a dialogue field of a user interface rendered on a first user device, a first input signal and generating a first structured output based on the first input signal;

rendering, in a canvas workspace of the user interface, a first canvas element including information related to the first structured output at a first location within the canvas workspace;

receiving, in the dialogue field, a second input signal and generating a second structured output based on the second input signal;

rendering, in the canvas workspace, a second canvas element including information related to the second structured output at a second location within the canvas workspace;

analyzing, by a spatial grammar interpreter of a server system, the information contained in the first and second canvas elements together with their relative spatial arrangement, for generating a semantic representation of user intent, wherein the analyzing comprises:

detecting proximity between the first and second canvas elements;

determining hierarchy based on relative vertical or horizontal positioning of the first and second canvas elements;

determining containment when one of the first and second canvas elements is spatially enclosed within a boundary of another:

constructing, by an intent analysis pipeline of the server system, an intent graph based on the semantic representation; and generating, by a code generation service of the server system, the digital experience based on the intent graph and rendering a preview of the digital experience on the user interface.

\* \* \* \* \*